United States Patent [19]
Pearl et al.

[11] Patent Number: 5,599,447
[45] Date of Patent: Feb. 4, 1997

[54] MANIFOLD APPARATUS FOR TANGENTIAL FLOW FILTRATION APPARATUS

[75] Inventors: Steven R. Pearl, Nashua, N.H.; Andrew G. Proulx, Concord; Brian Hillier, Chelmsford, both of Mass.

[73] Assignee: Millipore Investment Holdings Limited, Wilmington, Del.

[21] Appl. No.: 468,177

[22] Filed: Jun. 6, 1995

[51] Int. Cl.⁶ .................................................. B01D 63/00
[52] U.S. Cl. .................. 210/321.75; 210/321.84; 210/346; 210/433.1; 210/456
[58] Field of Search ..................... 210/341, 340, 210/346, 456, 347, 247, 488, 489, 321.75, 321.84, 321.64, 433.1

[56] References Cited

U.S. PATENT DOCUMENTS

| | | | |
|---|---|---|---|
| 4,212,747 | 7/1980 | Solomon et al. | 210/346 |
| 4,597,868 | 7/1986 | Watanabe | 210/347 |
| 4,849,102 | 7/1989 | Latour et al. | 210/321.64 |
| 5,096,582 | 3/1992 | Lombardi et al. | 210/321.75 |
| 5,147,542 | 9/1992 | Proulx | 210/321.75 |
| 5,176,828 | 1/1993 | Proulx | 210/456 |

*Primary Examiner*—Ana Fortuna
*Attorney, Agent, or Firm*—Andrew T. Karnakis; Paul J. Cook

[57] ABSTRACT

A manifold segment is provided for tangential flow filtration apparatus. The manifold segment includes a fluid feed conduit, a retentate conduit, a filtrate inlet and a filtrate outlet. An adaptor manifold is provided which directs filtrate from the manifold segment into a tangential flow filtration module and directs filtrate from the module into the manifold segment. Filtrate introduced into the tangential flow filtrate module reduces pressure drop across a filter layer in the module.

56 Claims, 10 Drawing Sheets

MANIFOLD APPARATUS FOR TANGENTIAL FLOW FILTRATION APPARATUS

BACKGROUND OF THE INVENTION

This invention relates to a manifold apparatus for a plurality of liquid filtration segments wherein filtration is effected by tangential flow of the liquid across a filter surface. More particularly, this invention relates to a manifold which permits stacking of a plurality of filtration modules wherein liquid is introduced and removed from the filtration module under conditions to provide improved separation of filtrate species from retentate species.

Prior to the present invention, liquids, primarily aqueous liquids, have been filtered by tangential flow modules wherein a plurality of filters are stacked between two manifolds, one at the bottom of the stack and one at the top of the stack. The filtration module stack comprises a collection of one or more filtration modules and associated intermodule gaskets. The filters are separated by appropriate screens and liquid-impervious layers to permit liquid flow, as well as filtrate and retentate flow into and from the stack. In addition, flow holes are provided through the layers within the stack. The holes are sealed appropriately to prevent admixture of filtrate with incoming liquid feed or retentate. The manifolds in each segment are designed so that filtrate is removed from both the top and bottom manifolds while incoming liquid is introduced into one manifold and retentate is removed from the second manifold. This manifold arrangement necessitates fittings to both manifolds in order to supply and remove liquid to and from the stack. This is undesirable since additional manipulative steps for removing and connecting the fittings are required when it is desirable to replace the filtration elements forming the stack.

A common problem encountered with the use of tangential flow filtration modules is the formation and growth of a retentate boundary layer on the filter surface adjacent the fluid inlet or inlets to the retentate surface of the filter. The formation of this layer reduces the efficiency of the filter and mitigates against fine separation of constituents in the fluid feed. This, in turn, results in undesirable retention of desired portions of the filtrate in the retentate. It is believed that a prime cause of the formation of the boundary layer is the relatively high pressure drop along the retentate side of the filter, resulting in high feed inlet pressure.

It has been proposed in U.S. Pat. No. 4,849,102 to provide a manifold for a plurality of filtration modules. However, this manifold arrangement is limited to only one manifold while avoiding the need for conduits external the manifold. That is, when more than one manifold is utilized, external connecting conduits are required.

It has been proposed in U.S. Pat. No. 5,147,542 to provide a manifold apparatus for tangential flow filtration modules which eliminates the need for conduits outside the manifold apparatus and the filtration modules to attain desired flow of fluid feed, filtrate and retentate. It has also been proposed in U.S. Pat. No. 5,176,828 to provide a manifold apparatus for tangential flow modules at a central section within a stack of filtration modules in order to increase throughput rates of a fluid feed as compared to such an apparatus wherein a fluid is fed from an end of the stack of filtration modules.

Accordingly, it would be desirable to provide a manifold for a plurality of tangential flow filtration modules which accommodates any number of a plurality of filtration modules and manifolds and which provides a means to control pressure drop across a filter layer within the filtration module. In addition, it would be desirable to provide such a manifold which does not require additional conduits outside the manifold apparatus.

SUMMARY OF THE INVENTION

In accordance with this invention, a manifold apparatus is provided which can be in fluid communication with any number of a plurality of filtration modules and which provides a means for controlling pressure drop across a filter layer of the filtration modules. Control of pressure drop is effected by passing a filtrate stream into contact with the filtrate side of the filter layer in the filtration modules. It has been found that passing the filtrate stream into contact with the filtrate side of the filter layer is effective in creating a uniform pressure drop across the filter layer and thus creating a uniform and controllable retentate boundary layer and improving separation of desired filtrate species from retentate species. The manifold apparatus is comprised of one or a plurality of manifold segments which interconnect with one another to form a stack of manifold segments. Each manifold segment is secured to an adaptor manifold. The manifold segment holds filtration modules on each side and has internal conduits for the feed, filtrate and retentate. The adaptor manifold provides a means for diverting at least a portion of the filtrate to the filtrate side of the filter layer within a filtration module. The adaptor manifold connects incoming filtrate to the stack of manifold segments with the filtrate side of one or more filters within a filtration module. Filtrate is removed from the filtrate side of the filter into a filtrate outlet conduit by which filtrate is removed from the stack of manifold segments. Retentate is removed from the stack of manifold segments through a retentate conduit. Incoming fluid feed and filtrate can be passed through the stack of manifold segments either by series flow or by parallel flow.

DESCRIPTION OF SPECIFIC EMBODIMENTS

Figure 1:
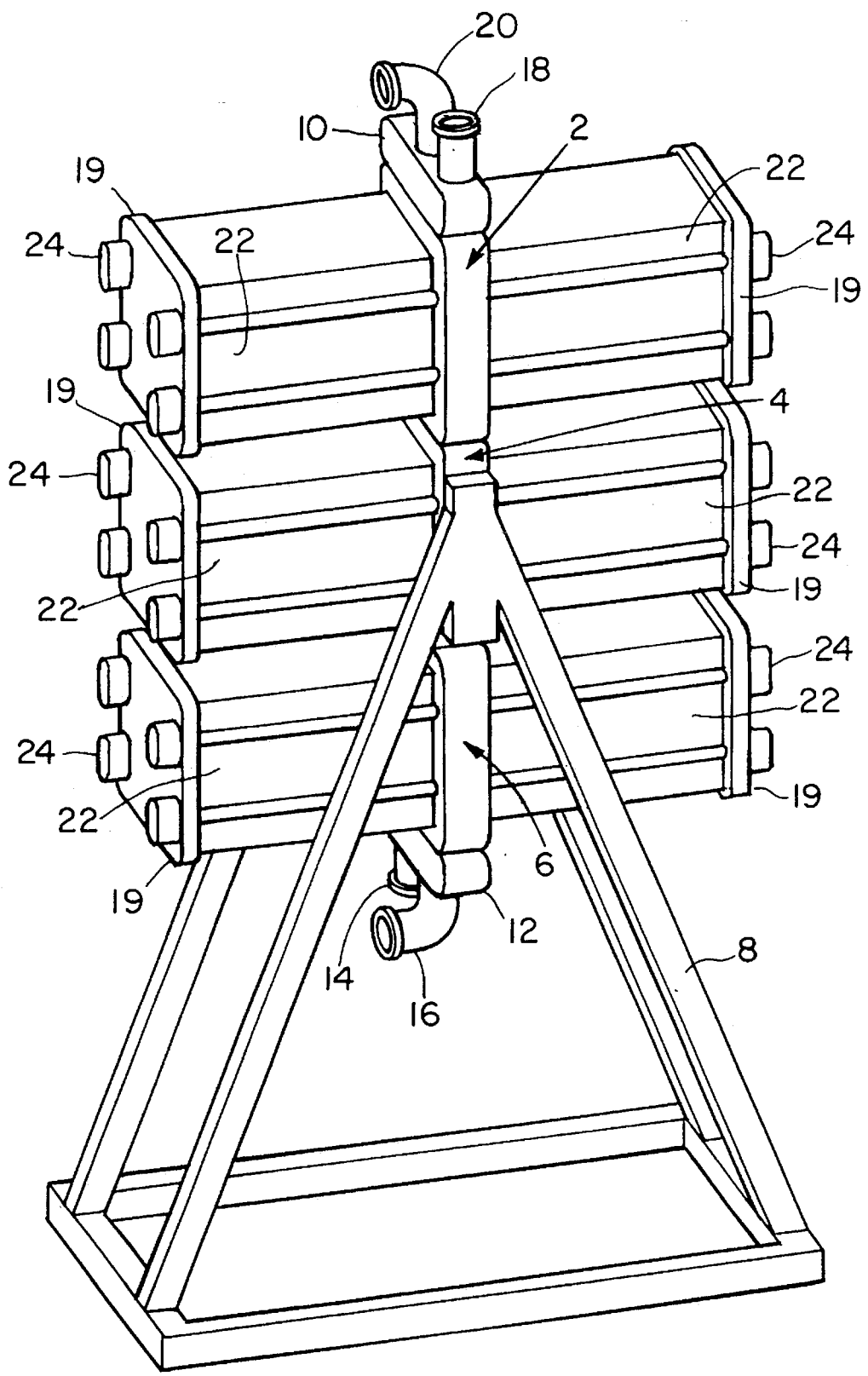
FIG. 1 is an isometric view of the manifold of this invention.

Referring to FIG. 1, the manifold apparatus of this invention includes one or a plurality of manifold segments 2, 4 and 6 connected together and which can be secured to manifold frame 8. Each end of the stack of manifold segments 2, 4 and 6 is provided with an optional fitting block 10 or 12 to provide suitable inlets and outlets to the manifold apparatus such as is disclosed in U.S. Pat. No. 5,147,542 which is incorporated herein by reference. Alternatively, suitable inlets and/or outlets can be positioned at a central location in the stack such as is disclosed in U.S. Pat. No. 5,176,828 which is incorporated herein by reference. A fluid feed inlet 14 and a filtrate inlet 16 are provided on fitting block 12, each of which are in fluid communication with suitable fluid storage means (not shown). A retentate outlet 18 and a filtrate outlet 20 are provided on fitting block 10, each of which are in fluid communication with a suitable fluid storage means (not shown). A plurality of filtration modules 22 are secured to manifold segments 2, 4 and 6 by means of a plate 19 and a plurality of compression assemblies 24 such as bolts.

Figure 2:
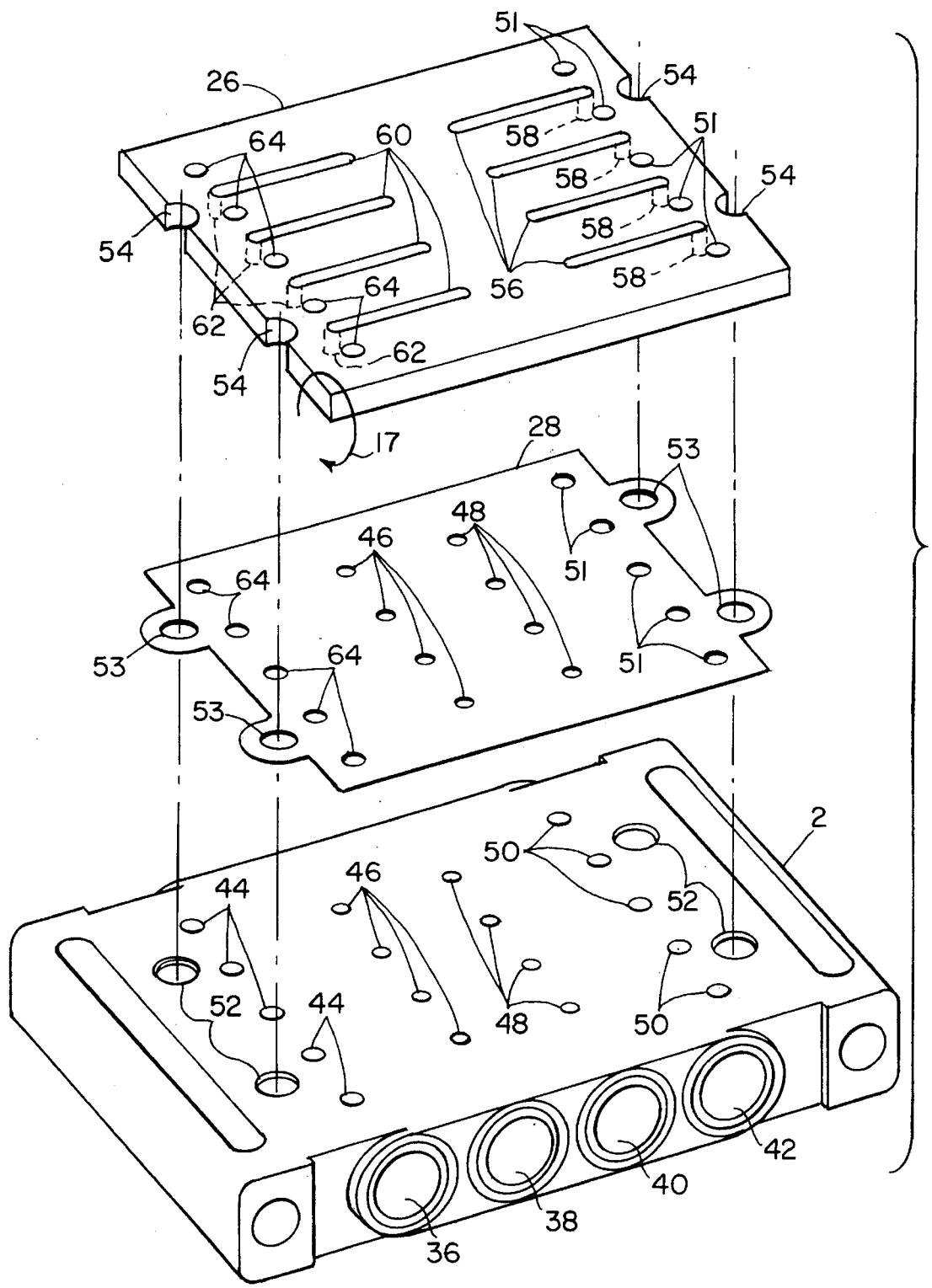
FIG. 2 is an exploded isometric view of the manifold segment and adaptor manifold of this invention.
Figure 3:
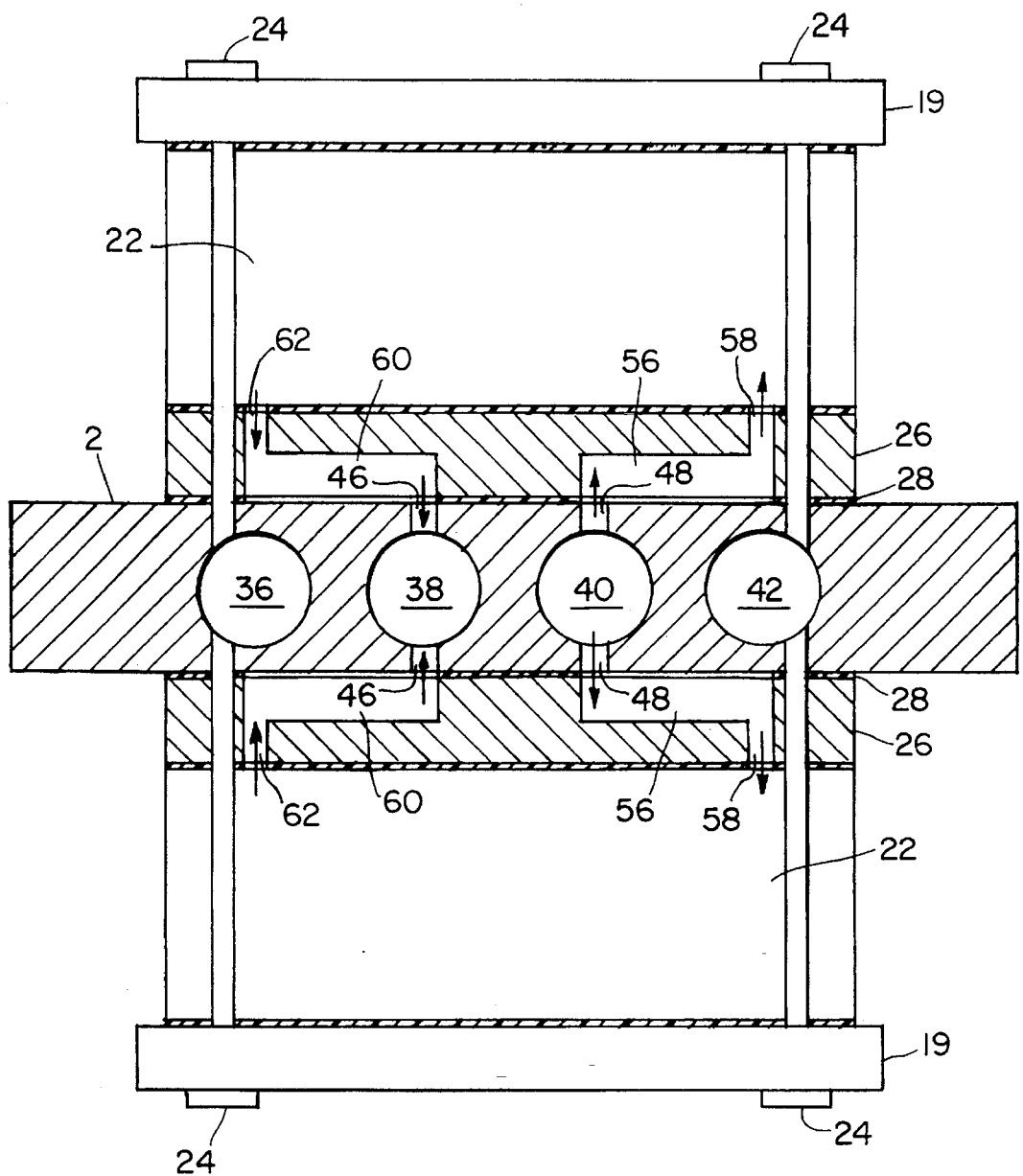
FIG. 3 is a cross-sectional view of the manifold segment and adaptor of FIG. 2 manifold with filtration modules.

Referring to FIGS. 2 and 3, the manifold apparatus of this invention includes a manifold segment 2, adaptor manifold 26 and gaskets 28 which provides a sealing means for fluid flow paths within manifold segment 2 and adaptor manifolds 26. As shown in FIG. 2, adaptor manifold 26 is rotated 180° toward the reader (arrow 17) to properly position it relative to manifold segment 2. Manifold segment 2 includes a retentate outlet conduit 36, a filtrate outlet conduit 38, a filtrate inlet conduit 40 and a fluid feed inlet conduit 42. Retentate outlet conduit 36 is in fluid communication with a plurality of retentate outlet means (holes) 44. Filtrate outlet conduit 38 is in fluid communication with filtrate outlet means (holes) 46. Filtrate inlet conduit 40 is in fluid communication with filtrate inlet means (holes) 48. Fluid feed inlet conduit 42 is in fluid communication with fluid feed inlet means (holes) 50. Holes 52 and 53 as well as slots 54 are provided for bolts 24.

Figure 4:
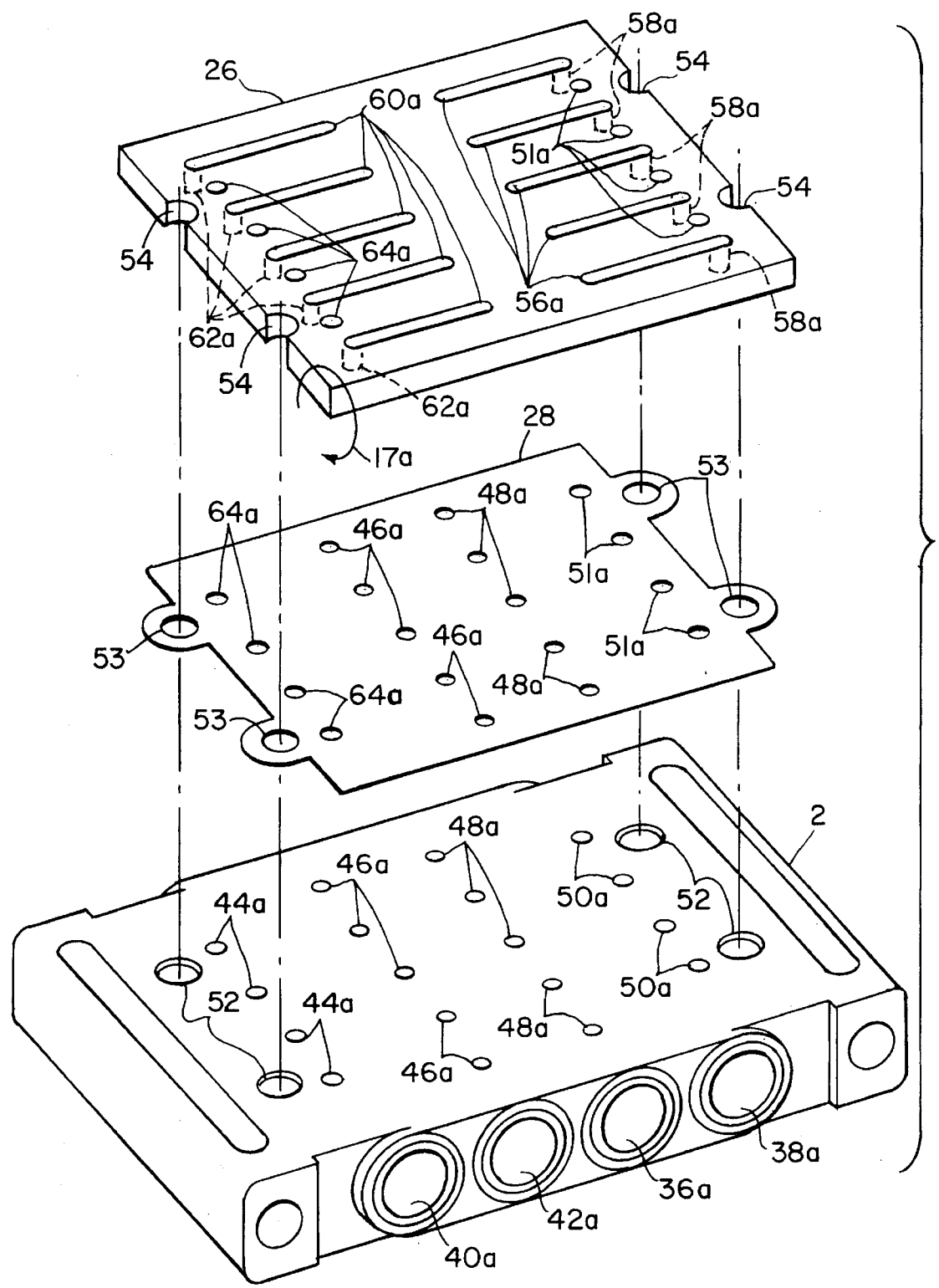
FIG. 4 is an exploded isometric view of the manifold segment and adaptor manifold of this invention with the feed inlet and retentate outlet positioned between the filtrate inlet and filtrate outlet.
Figure 5:
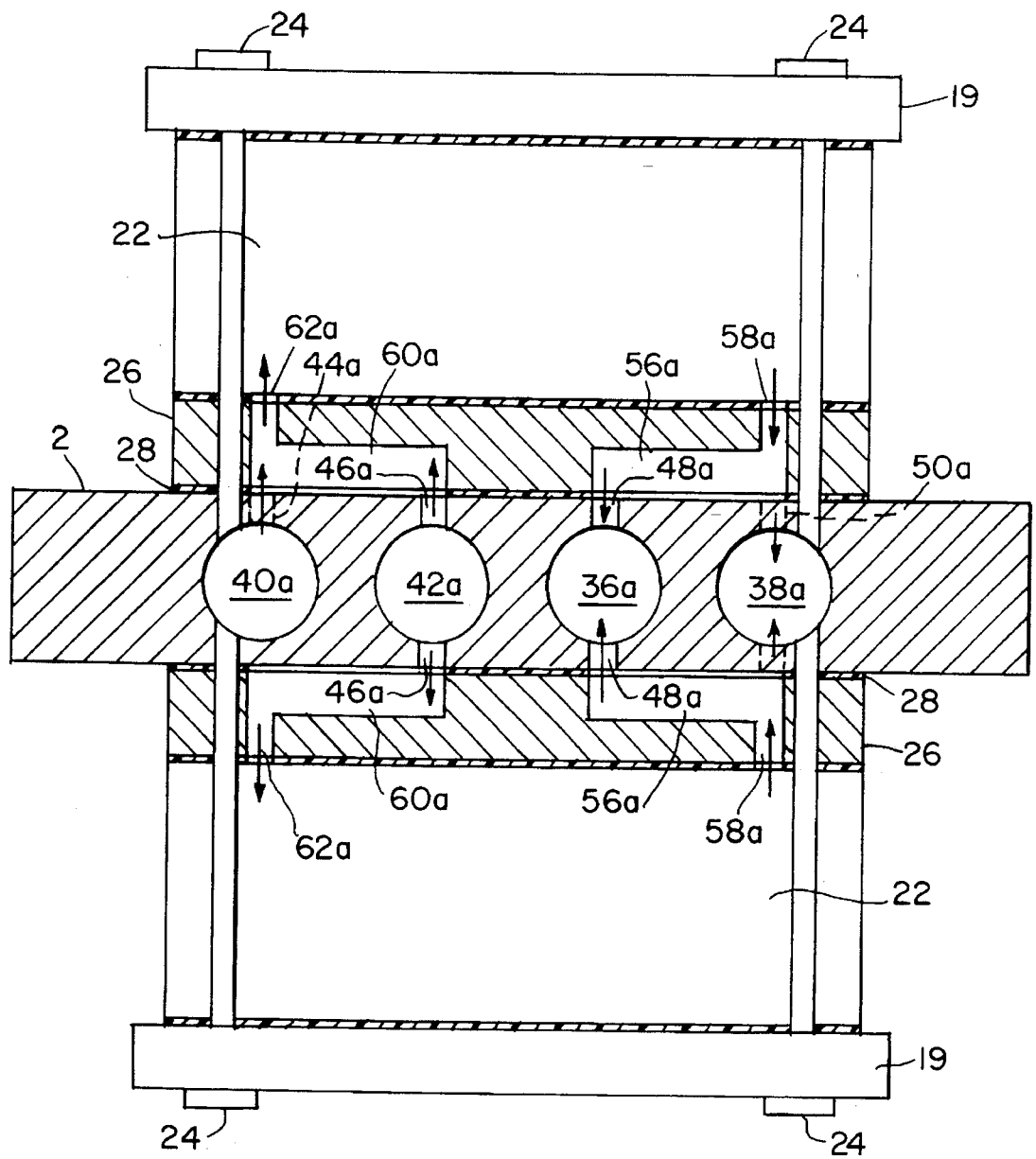
FIG. 5 is a cross sectional view of the manifold segment and adaptor manifold of FIG. 4 with filtration modules.

Fluid feed inlet means 50 are in fluid communication with holes 51 which extend through the thickness of adaptor manifold 26A. Filtrate inlet means 48 are in fluid communication with slots 56, each of which have holes 58 extending through the remaining thickness of adaptor manifold 26. Retentate outlet means 44 are in fluid communication with holes 64 which extend through the thickness of adaptor manifold 26. As shown in FIGS. 4 and 5, adaptor manifold 26 a is rotated 180° toward the reader (arrow 17a) to properly position it relative to manifold segment 2. Manifold segment 2 includes a retentate outlet conduit 36a, a filtrate outlet conduit 38a, a filtrate inlet conduit 40a and a fluid feed inlet conduit 42a. Retentate outlet conduit 36a is in fluid communication with a plurality of retentate outlet means (holes) 48a. Filtrate outlet conduit 38a is in fluid communication with filtrate outlet means (holes) 50a. Filtrate inlet conduit 40a is in fluid communication with filtrate inlet means (holes) 44a. Fluid feed inlet conduit 42a is in fluid communication with fluid feed inlet means (holes) 46a. Holes 52 and 53 as well as slots 54 are provided for bolts 24.

Fluid feed inlet means 46a are in fluid communication with holes 62 which extend through the thickness of adaptor manifold 26a. Filtrate inlet means 44a are in fluid communication with holes 64a extending through the remaining thickness of adaptor manifold 26a. Filtrate outlet means 50a are in fluid communication with 51a extending through the remaining thickness of adaptor manifold 26a. Retentate outlet-means 48a are in fluid communication with holes 58a which extend through the thickness of adaptor manifold 26a. Feed inlet means 46a are in fluid communication with slots 60a, each of which have holes 62a extending through the thickness of adaptor manifold 26a.

Figure 6:
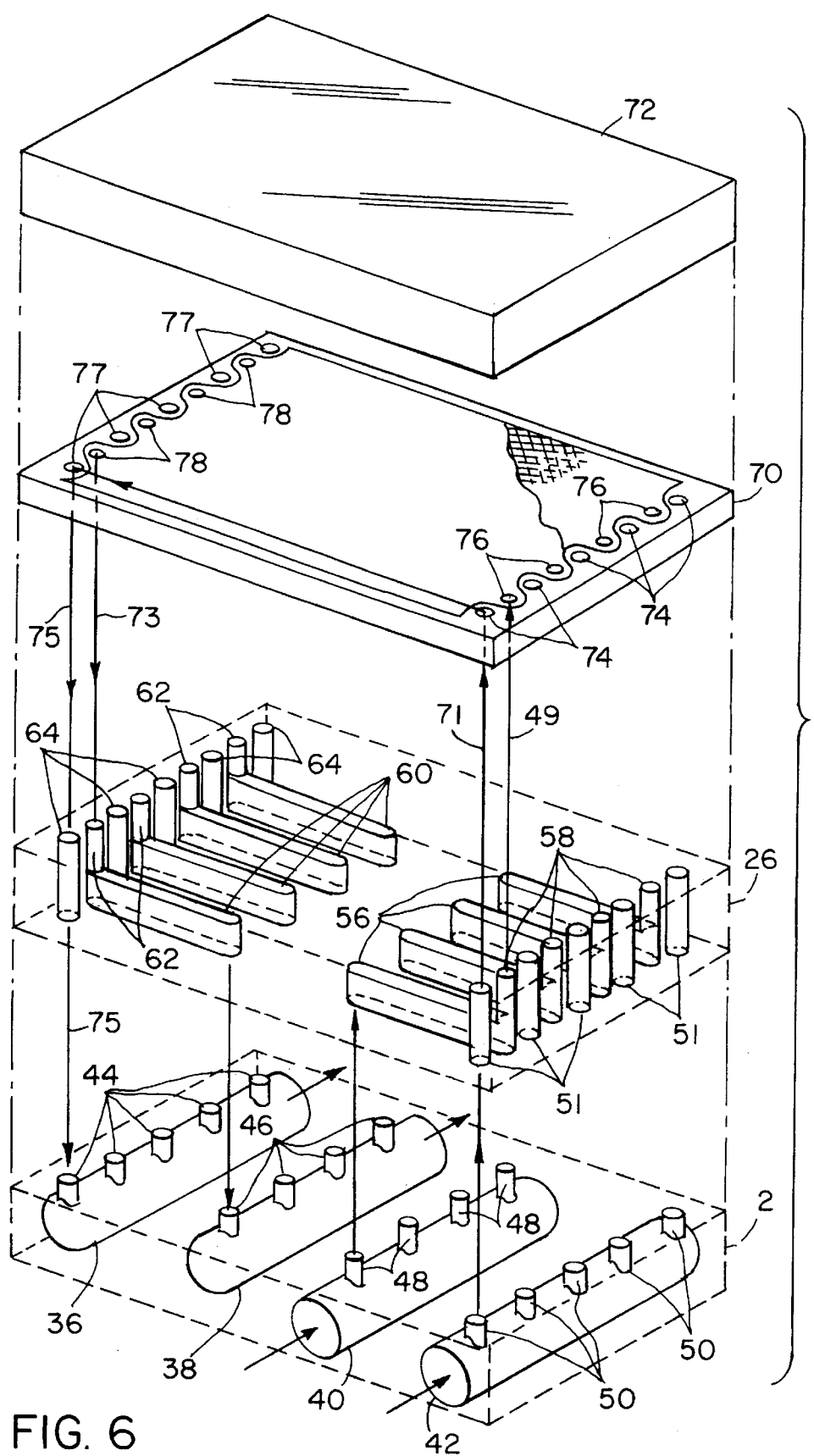
FIG. 6 is an exploded view of a filtration module with a manifold segment and adaptor manifold of this invention.

Referring to FIG. 6, where like elements with elements of FIGS. 2 and 3 are identified by the same reference numerals, a filtration module 70 useful with the manifold segment of this invention is described. Gaskets (not shown) are provided between elements to effect sealing in a manner well known in the art. The filtration module 70 is positioned between adaptor manifold 26 and end plate 72. The filtration module 70 includes holes 74 which communicate with fluid feed inlet means 50 through path 71 and holes 76 which communicate with filtrate inlet means 48 to provide inlet filtrate stream 49. The filtrate inlet holes 76 provide filtrate on the filtrate side of a filter layer (see FIG. 5) to increase pressure there and to decrease pressure drop across the filter layer. Filtrate outlet holes 78 communicate with filtrate outlet means 46 and filtrate outlet conduit 38 through path 73. The filtration segment 70 is also provided with holes 77 which communicate with retentate outlet means 44 through path 75. The plate 72 serves as a seal for the top surface of the filtration module 70.

Figure 7:
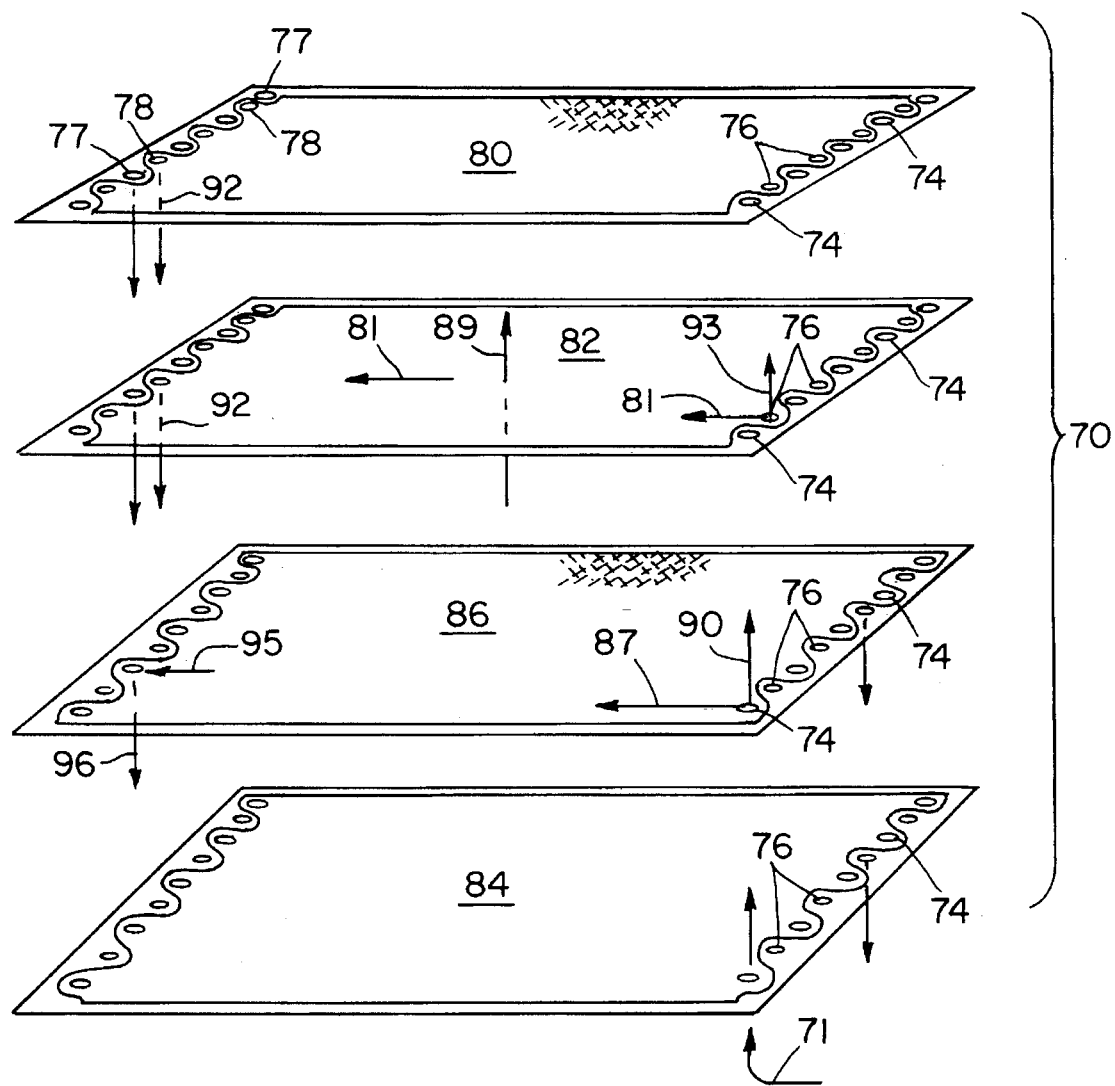
FIG. 7 is an exploded view of a filtration module used with the apparatus of this invention.

Referring to FIG. 7 the filtration module 70 includes a filtrate spacer 80, a filter layer 82, a retentate spacer 86 and a filter layer 84 with a second filtrate spacer 80 (not shown). The liquid feed represented by arrow 71 passes through holes 74 in layer 84 into spacer 86. A portion of the liquid passes through filter 82 as represented by arrow 89. The remaining portion of the incoming liquid passes upwardly as represented by arrow 90 through holes 74 in filter 82, holes 74 in filtrate spacer 80 and into the next adjacent filtration module (not shown) wherein it proceeds as described above with reference to filtration module 70. The filtrate passes in the direction of arrows 81 into holes 78 and passes in a direction as shown by arrows 92 and 93 toward filtrate outlet conduit 38 (FIG. 4). The retentate passes across retentate spacer 86 as shown by arrows 87 and 95 through holes 77 and to retentate outlet conduit 36 (FIG. 4) in a direction as shown by arrow 96.

Figure 8:
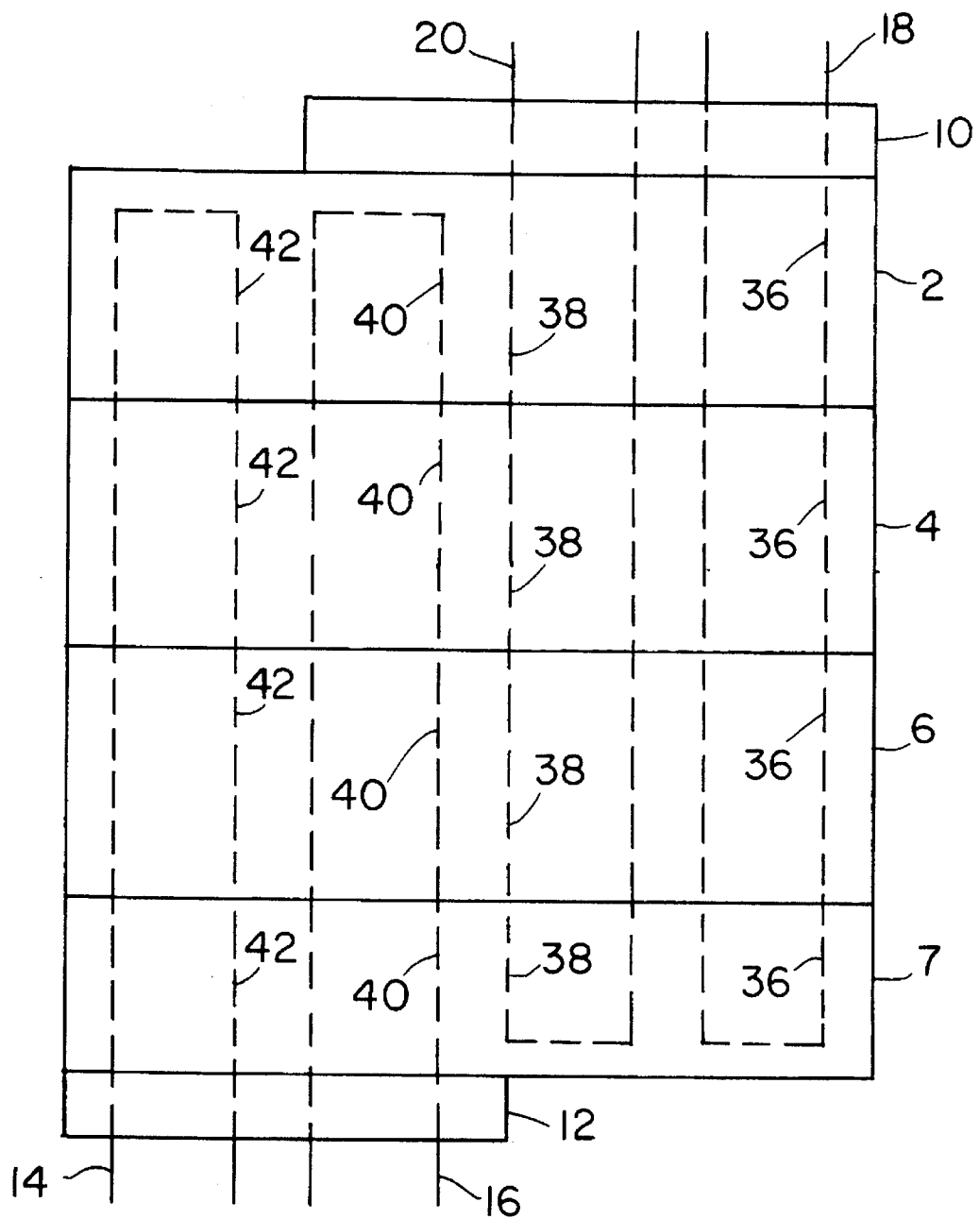
FIG. 8 is a schematic view of a stack of manifold segments with feed fluid entering an end of the slack.
Figure 9:
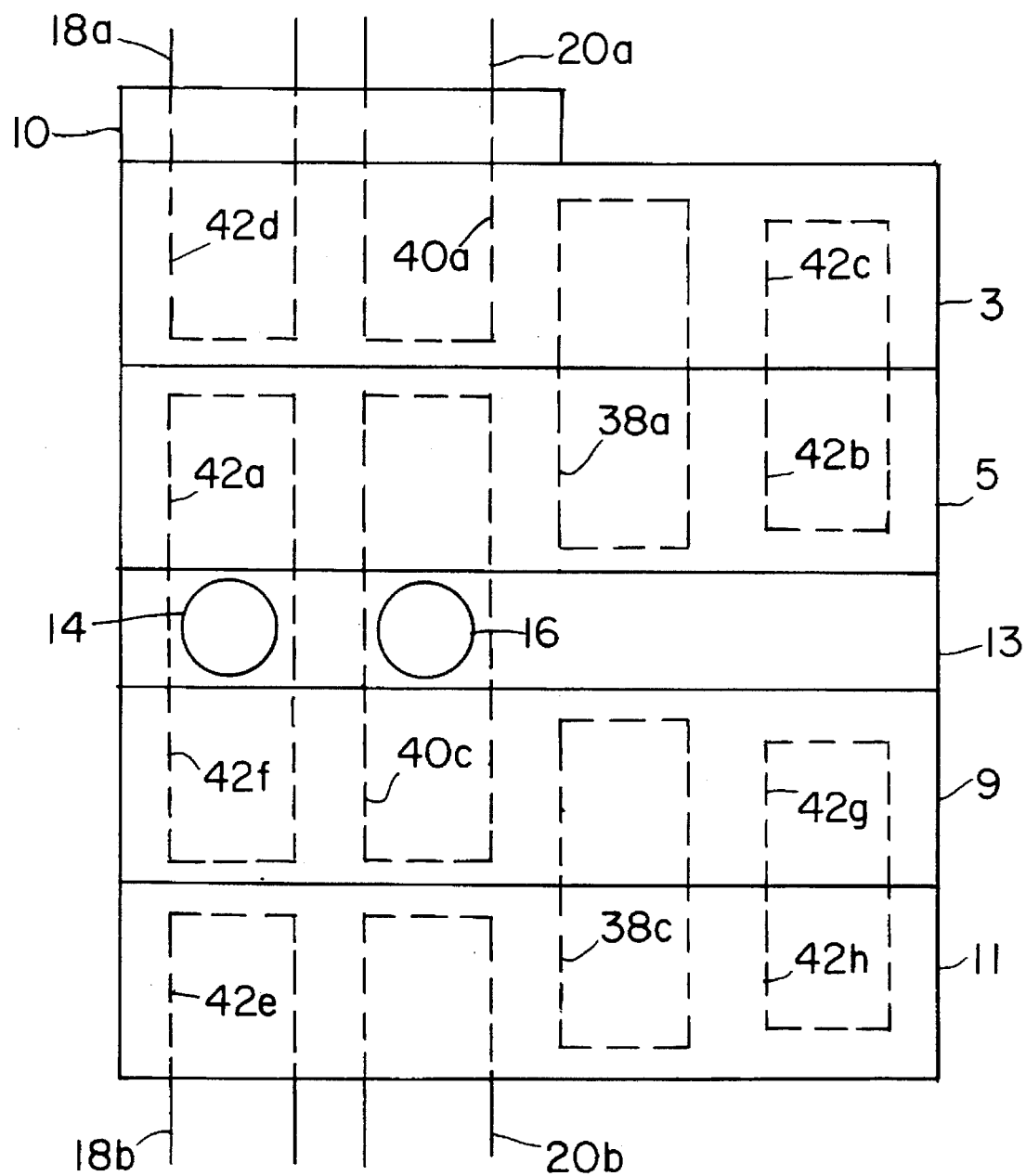
FIG. 9 is schematic view of a stack of manifold segments with central fluid feed and serial feed flow within the stack.
Figure 10:
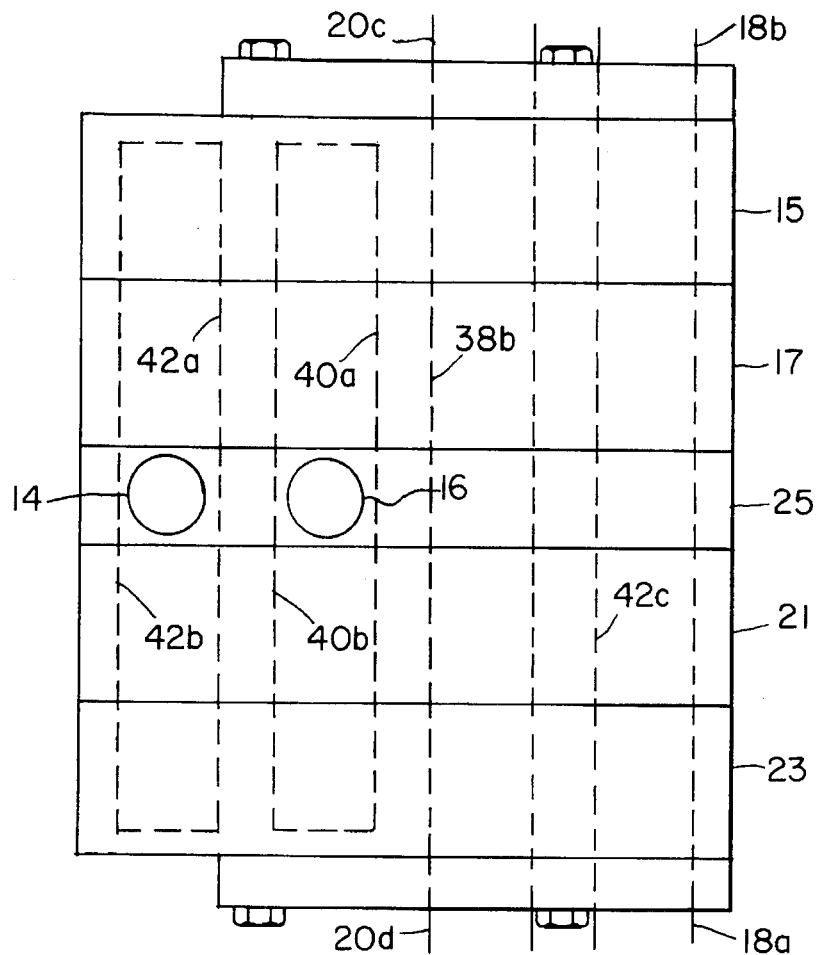
FIG. 10 is a schematic view of a stack of manifold segments with central fluid feed and parallel feed flow within the stack.

FIGS. 8–10 show representative flow arrangements for a stack of manifold segments and associated adaptor manifolds of this invention. Referring to FIG. 8, a fluid feed inlet 14 introduces feed in parallel flow through manifold segments 2, 4, 6 and 7 through fluid feed conduits 42. Filtrate inlet 16 introduces filtrate also in parallel flow through manifold segment 2, 4, 6 and 7 through filtrate inlet conduits 40. Filtrate is removed from the stack by filtrate outlet 20 through filtrate outlet conduits 38. Retentate is removed from the stack by retentate outlet 18 through retentate outlet conduits 36.

Referring to FIG. 9, fluid feed inlet 14 introduces feed to a stack of manifold segments 3, 5, 9 and 11 through a centrally located manifold 13. Feed passes in series sequentially through fluid feed conduits 42a, 42b 42c and 42d and out retentate outlet 18a as well as through fluid feed conduits 42f, 42g, 42h and 42i and out retentate outlet 18b. Filtrate is introduced through filtrate inlet 16 and in series through filtrate inlet conduits 40a and filtrate outlet conduit 38a and out filtrate outlet 20a. Filtrate also passes sequentially through filtrate inlet conduit 40c and filtrate outlet conduit 38c and out filtrate outlet 20b.

Referring to FIG. 10, fluid feed is introduced to a stack of manifold segments 15, 17, 21 and 23 through feed inlet 14 in centrally positioned manifold 25. Fluid feed passed through feed inlet conduits 42a and 42b to conduit 42c and out retentate outlets 18a and 18b. Filtrate is introduced through filtrate inlet 16 through filtrate inlet conduits 40a and 40b and into filtrate outlet conduits 38b and out filtrate outlets 20c and 20d.

Figure 11:
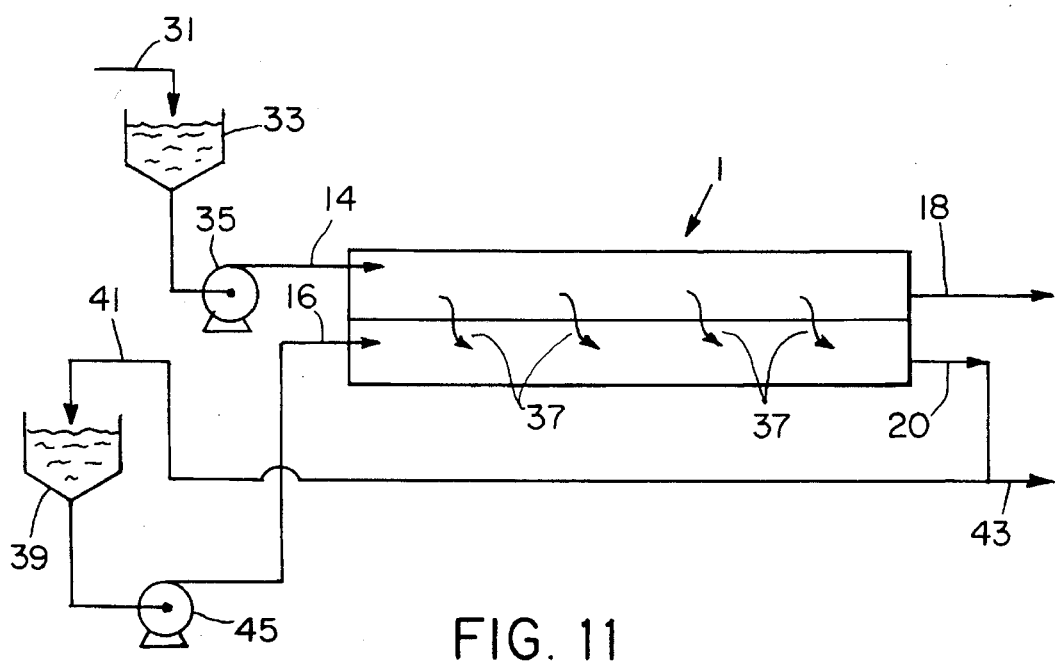
FIG. 11 is a schematic view of process fluid flow with the apparatus of this invention.

Referring to FIG. 11, the operation of the apparatus of this invention is illustrated. Feed fluid 31 is introduced in storage tank 33 and is pumped by pump 35 through feed inlet 14 into a stack of manifold segments, where it is separated into which is removed or recycled to tank 33 through retentate outlet 18. Filtrate is removed from stack 1 through filtrate outlet 20 and a portion of the filtrate is directed to storage tank 39 through conduit 41. A portion 43 of the filtrate is separated and stored. The remaining portion of the filtrate is pumped by pump 45 and introduced into stack 1 through filtrate inlet 16.

We claim:

1. An apparatus for fluid filtration which comprises:

a manifold segment having a first surface, a second surface, a third surface and a fourth surface, said third surface and said fourth surface being spaced apart from each other and being positioned between said first surface and said second surface, at least one of said third surface or said fourth surface having a plurality of fluid feed inlet means, a plurality of filtrate inlet means, a plurality of filtrate outlet means and a plurality of retentate outlet means, said fluid feed inlet means being in fluid communication with a fluid feed inlet conduit positioned within said manifold segment, said filtrate inlet means being in fluid communication with a filtrate inlet conduit positioned within said manifold segment, said filtrate outlet means being in fluid communication with a filtrate outlet conduit positioned within said manifold segment,, said retentate outlet means being in fluid communication with a retentate conduit positioned within said manifold segment, said fluid feed inlet conduit being in fluid communication with a fluid feed inlet on at least one of said first surface or said second surface, said filtrate inlet conduit being in fluid communication with a filtrate inlet on at least one of said first surface or said second surfaces, said filtrate outlet conduit being in fluid communication with a filtrate outlet on at least one of said first surface on said second surface, said retentate outlet conduit being in fluid communication with a retentate outlet on at least one of said first surface or said second surface, and at least one adaptor manifold having a fifth surface having a first set of slots and a second set of slots, said first set of slots positioned to effect fluid communication from said filtrate inlet means and through said manifold segment adaptor, and said second set of slots positioned to effect fluid communication through said adaptor manifold to said filtrate outlet means.

2. The apparatus of claim 1 wherein both said third surface and said fourth surface have a plurality of fluid feed inlet means, a plurality of filtrate inlet means, a plurality of filtrate outlet means and a plurality of retentate outlet means, and two of said adaptor manifolds wherein one of said adaptor manifolds is positioned on said third surface and the other of said adaptor manifolds is positioned on said fourth surface.

3. The apparatus of claim 2 wherein a plurality of said manifold segments are connected together to effect fluid communication between at least one of (a) said filtrate inlet conduits and (b) said filtrate outlet conduits in adjacent manifold segments and at least one of (a) said fluid feed inlet conduits and (b) said retentate outlet conduits in adjacent manifold segments.

4. The apparatus of claim 3 wherein said plurality of manifold segments have a first end and a second end and a first fluid feed inlet positioned between said first end and said second end and being in fluid communication with fluid feed inlet conduits positioned within said manifold segments, means for introducing filtrate into said manifold segments and means for removing filtrate and retentate from said manifold segments.

5. The apparatus of claim 3 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, means for introducing filtrate into said manifold segments and means for removing filtrate from said manifold segments.

6. The apparatus of claim 3 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet positioned between said first end and said second end and being in fluid communication with retentate outlet conduits within said manifold segments, a first filtrate outlet positioned between said first end and said second end and being in fluid communication with filtrate outlet conduits positioned within said manifold segments and means for introducing filtrate into said manifold segments.

7. The apparatus of claim 3 wherein said plurality of manifold segments have a first end and a second end and a first fluid feed inlet positioned on said first end and being in fluid communication with fluid feed inlet conduits positioned within said manifold segments, means for introducing filtrate into said manifold segments and means for removing filtrate and retentate from said manifold segments.

8. The apparatus of claim 3 wherein said plurality of manifold segments have a first end and a second end, a first fluid feed inlet positioned on said first end and being in fluid communication with fluid feed inlet conduits positioned within said manifold segments and a first retentate outlet positioned between said first end and said second end and being in fluid communication with retentate outlet conduits within said manifold segments, means for introducing filtrate into said manifold segments and means for removing filtrate from said manifold segments.

9. The apparatus of claim 3 wherein said plurality of manifold segments have a first end and a second end, a first fluid feed inlet positioned on said first end and being in fluid communication with fluid feed inlet conduits positioned within said manifold segments, a first retentate outlet positioned on said second end and being in fluid communication with retentate outlet conduits within said manifold segments, and a first filtrate outlet positioned on said first end a second filtrate outlet positioned on said second end, said first filtrate outlet and said second filtrate outlet being in fluid communication with filtrate outlet conduits positioned within said manifold segments and means for introducing filtrate into said manifold segments.

10. Apparatus for filtering a feed fluid to produce a filtrate and a retentate which comprises the apparatus of claim 3 wherein said plurality of manifold segments have a first end and a second end and a first fluid feed inlet positioned between said first end and said second end and being in fluid communication with fluid feed inlet conduits positioned within said manifold segments, means for removing filtrate and retentate from said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer.

11. Apparatus for filtering a feed fluid to produce a filtrate and a retentate which comprises the apparatus of claim 3 wherein said plurality of manifold segments have a first end and a second end, a first fluid feed inlet positioned between said first end and said second end and being in fluid communication with fluid feed inlet conduits positioned within said manifold segments and a first retentate outlet positioned between said first end and said second end and being in fluid communication with retentate outlet conduits within said manifold segments, means for removing filtrate and retentate from said manifold segments, and a filtration module in fluid communication with each of said manifold segments and an adaptor manifold on each manifold segment to introduce feed fluid on a feed side of a filter layer in said filtration module, and to introduce filtrate on a filtrate side of said filter layer.

12. Apparatus for filtering a feed fluid to produce a filtrate and a retentate which comprises the apparatus of claim 3 wherein said plurality of manifold segments have a first end and a second end, a first fluid inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, a first filtrate outlet positioned between said first end and said second end and being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

13. Apparatus for filtering a feed fluid to produce a filtrate and a retentate which comprises the apparatus of claim 3 wherein said plurality of manifold segments have a first end and a second end, a first fluid inlet positioned on said first end and being in fluid communication with fluid feed inlet conduits positioned within said manifold segments and filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

14. Apparatus for filtering a feed fluid to produce a filtrate and a retentate which comprises the apparatus of claim 3 wherein said plurality of manifold segments have a first end and a second end, a first fluid inlet positioned on said first end and being in fluid communication with fluid feed inlet conduits positioned within said manifold segments and a first retentate outlet positioned on said second end and being in fluid communication with retentate outlet conduits within said manifold segments, means for removing filtrate and retentate from said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer.

15. Apparatus for filtering a feed fluid to produce a filtrate and a retentate which comprises the apparatus of claim 3 wherein said plurality of manifold segments have a first end and a second end, a first fluid inlet positioned on said first end and being in fluid communication with fluid feed inlet conduits positioned within said manifold segments, a first retentate outlet positioned on said second end and being in fluid communication with retentate outlet conduits within manifold segments, a first filtrate outlet positioned on said first end, a second filtrate outlet positioned on said second end, said first filtrate outlet and said second filtrate outlet being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

16. The apparatus of claim 1 wherein a plurality of said manifold segments are connected together to effect fluid communication between at least one of (a) said filtrate inlet conduits and (b) said filtrate outlet conduits in adjacent manifold segments and at least one of (a) said fluid feed inlet conduits and (b) said retentate outlet conduits in adjacent manifold segments.

17. The apparatus of claim 16 wherein said plurality of manifold segments have a first end and a second end and a first fluid feed inlet positioned between said first end and said second end and being in fluid communication with fluid feed inlet conduits positioned within said manifold segments, means for introducing filtrate into said manifold segments and means for removing filtrate and retentate from said manifold segments.

18. The apparatus of claim 16 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, means for introducing filtrate into said manifold segments and means for removing filtrate from said manifold segments.

19. The apparatus of claim 16 wherein said plurality of manifold segments have a first end and a second end, a first fluid feed inlet positioned between said first end and said second end and being in fluid communication with fluid feed inlet conduits positioned within said manifold segments and a first retentate outlet positioned between said first end and said second end and being in fluid communication with retentate outlet positioned between said first end and said second end and being in fluid communication with retentate outlet conduits within said manifold segments, and a first filtrate outlet positioned between said first end and said second end and being in fluid communication with filtrate outlet conduits positioned within said manifold segments and means for introducing filtrate into said manifold segments.

20. The apparatus of claim 16 wherein said plurality of manifold segments have a first end and a second end and a first fluid feed inlet positioned on said first end and being in fluid communication with fluid feed inlet conduits positioned within said manifold segments and means for removing filtrate, means for introducing filtrate into said manifold segments and means for removing filtrate and retentate from said manifold segments.

21. The apparatus of claim 16 wherein said plurality of manifold segments have a first end and a second end, a first fluid feed inlet positioned on first end and being in fluid communication with fluid feed inlet conduits positioned within said manifold segments and a first retentate outlet positioned on said second end and being in fluid communication with retentate outlet conduits within said manifold segments, means for introducing filtrate into said manifold segments and means for removing filtrate from said of manifold segments.

22. The apparatus of claim 16 wherein said plurality of manifold segments have a first end and a second end, a first fluid feed inlet positioned on said first end and being in fluid communication with fluid feed inlet conduits positioned within said manifold segments, a first retentate outlet positioned on said second end and being in fluid communication with retentate outlet conduits within said manifold segments, a first filtrate outlet positioned on said first end a second filtrate outlet positioned on said second end, said first filtrate outlet and said second filtrate outlet being in fluid communication with filtrate outlet conduits positioned within said manifold segments and, means for introducing filtrate into said manifold segments.

23. Apparatus for filtering a feed fluid to produce a filtrate and a retentate which comprises the apparatus of claim 16 wherein said plurality of manifold segments have a first end and a second end and a first fluid feed inlet positioned between said first end and said second end and being in fluid communication with fluid feed inlet conduits positioned within said manifold segments, means for removing filtrate and retentate from said plurality of manifold segments and a filtration module in fluid communication with each of said manifold segments and an adaptor manifold on each manifold segment to introduce feed fluid on a feed side of a filter layer in said filtration module and to introduce filtrate on a filtrate side of said filter layer.

24. Apparatus for filtering a feed fluid to produce a filtrate and a retentate which comprises the apparatus of claim 16 wherein said plurality of manifold segments have a first end and a second end, a first fluid feed inlet positioned between said first end and said second end and being in fluid communication with fluid feed inlet conduits positioned within said manifold segments and a first retentate outlet positioned between said first end and said second end and being in fluid communication with retentate outlet conduits within said manifold segments, means for removing filtrate and retentate from said manifold segments, and filtration module in fluid communication with each of said manifold segments and an adaptor manifold on each manifold segment to introduce feed fluid on a feed side of a filter layer in said filtration module, and to introduce filtrate on a filtrate side of said filter layer.

25. Apparatus for filtering a feed fluid to produce a filtrate and a retentate which comprises the apparatus of claim 16 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, a first filtrate outlet positioned between said first end and said second end and being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

26. Apparatus for filtering a feed fluid to produce a filtrate and a retentate which comprises the apparatus of claim 16 wherein said plurality of manifold segments have a first end and a second end, a first fluid inlet positioned on said first end and being in fluid communication with fluid feed inlet conduits positioned within said manifold segments and filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

27. Apparatus for filtering a feed fluid to produce a filtrate and a retentate which comprises the apparatus of claim 16 wherein said plurality of manifold segments have a first end and a second end, a first fluid inlet positioned on said first end and being in fluid communication with fluid feed inlet conduits positioned within said manifold segments and a first retentate outlet positioned on said second end and being in fluid communication with retentate outlet conduits within said manifold segments, means for removing filtrate and retentate from said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter in said filter layer.

28. Apparatus for filtering a feed fluid to produce a filtrate and a retentate which comprises the apparatus of claim 16 wherein said plurality of manifold segments have a first end and a second end, a first fluid inlet positioned on said first end and being in fluid communication with fluid feed inlet conduits positioned within said manifold segments, a first retentate outlet positioned on said second end and being in fluid communication with retentate outlet conduits within manifold segments, a first filtrate outlet positioned on said first end, a second filtrate outlet positioned on said second end, said first filtrate outlet and said second filtrate outlet being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

29. An apparatus for fluid filtration which comprises:
a manifold segment having a first surface, a second surface, a third surface and a fourth surface,
said third surface and said fourth surface being spaced apart from each other and being positioned between said first surface and said second surface, at least one of said third surface or said fourth surface having a plurality of fluid feed inlet means, a plurality of filtrate inlet means, a plurality of filtrate outlet means and a plurality of retentate outlet means, said fluid feed inlet means being in fluid communication with a fluid feed inlet conduit positioned within said manifold segment, said filtrate inlet means being in fluid communication with a filtrate inlet conduit positioned within said manifold segment, said filtrate outlet means being in fluid communication with a filtrate outlet conduit positioned within said manifold segment,, said retentate outlet means being in fluid communication with a retentate conduit positioned within said manifold segment, said fluid feed inlet conduit being in fluid communication with a fluid feed inlet on at least one of said first surface or said second surface, said filtrate inlet conduit being in fluid communication with a filtrate inlet on at least one of said first surface or said second surfaces, said filtrate outlet conduit being in fluid communication with a filtrate outlet on at least one of said first surface on said second surface, said retentate outlet conduit being in fluid communication with a retentate outlet on at least one of said first surface or said second surface, and at least one adaptor manifold having a fifth surface having a first set of slots and a second set of slots, said first set of slots positioned to effect fluid communication from said feed inlet means and through said manifold segment adaptor, and said second set of slots positioned to effect fluid communication through said adaptor manifold to said retentate outlet means.

30. The apparatus of claim 29 wherein both said third surface and said fourth surface have a plurality of fluid feed inlet means, a plurality of filtrate inlet means, a plurality of filtrate outlet means and a plurality of retentate outlet means, and two of said adaptor manifolds wherein one of said adaptor manifolds is positioned on said third surface and the other of said adaptor manifolds is positioned on said fourth surface.

31. The apparatus of claim 30 wherein a plurality of said manifold segments are connected together to effect fluid communication between at least one of (a) said filtrate inlet conduits and (b) said filtrate outlet conduits in adjacent manifold segments and at least one of (a) said fluid feed inlet conduits and (b) said retentate outlet conduits in adjacent manifold segments.

32. The apparatus of claim 31 wherein said plurality of manifold segments have a first end and a second end and a first fluid feed inlet positioned between said first end and said second end and being in fluid communication with fluid feed inlet conduits positioned within said manifold segments, means for introducing filtrate into said manifold segments and means for removing filtrate and retentate from said manifold segments.

33. The apparatus of claim 31 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, means for introducing filtrate into said manifold segments and means for removing filtrate from said manifold segments.

34. The apparatus of claim 31 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet positioned between said first end and said second end and being in fluid communication with retentate outlet conduits within said manifold segments, a first filtrate outlet positioned between said first end and said second end and being in fluid communication with filtrate outlet conduits positioned within said manifold segments and means for introducing filtrate into said manifold segments.

35. The apparatus of claim 31 wherein said plurality of manifold segments have a first end and a second end and a first fluid feed inlet positioned on said first end and being in fluid communication with fluid feed inlet conduits positioned within said manifold segments, means for introducing filtrate into said manifold segments and means for removing filtrate and retentate from said manifold segments.

36. The apparatus of claim 31 wherein said plurality of manifold segments have a first end and a second end, a first fluid feed inlet positioned between said first end and said second end and being in fluid communication with fluid feed inlet conduits positioned within said manifold segments and a first retentate outlet positioned between said first end and said second end and being in fluid communication with retentate outlet conduits within said manifold segments, means for introducing filtrate into said manifold segments and means for removing filtrate from said manifold segments.

37. The apparatus of claim 31 wherein said plurality of manifold segments have a first end and a second end, a first fluid feed inlet positioned on said first end and being in fluid communication with fluid feed inlet conduits positioned within said manifold segments, a first retentate outlet positioned on said second end and being in fluid communication with retentate outlet conduits within said manifold segments, and a first filtrate outlet positioned on said first end a second filtrate outlet positioned on said second end, said first filtrate outlet and said second filtrate outlet being in fluid communication with filtrate outlet conduits positioned within said manifold segments and means for introducing filtrate into said manifold segments.

38. Apparatus for filtering a feed fluid to produce a filtrate and a retentate which comprises the apparatus of claim 31 wherein said plurality of manifold segments have a first end and a second end and a first fluid feed inlet positioned between said first end and said second end and being in fluid communication with fluid feed inlet conduits positioned within said manifold segments, means for removing filtrate and retentate from said manifold segments and a filtration module in fluid communication with each of said manifold segments and an adaptor manifold on each manifold segment to introduce feed fluid on a feed side of a filter layer in said filtration module, and to introduce filtrate on a filtrate side of said filtration module.

39. Apparatus for filtering a feed fluid to produce a filtrate and a retentate which comprises the apparatus of claim 31 wherein said plurality of manifold segments have a first end and a second end, a first fluid feed inlet positioned between said first end and said second end and being in fluid communication with fluid feed inlet conduits positioned within said manifold segments and a first retentate outlet positioned between said first end and said second end and being in fluid communication with retentate outlet conduits within said manifold segments, means for removing filtrate and retentate from said manifold segments, and a filtration module in fluid communication with each of said manifold segments and an adaptor manifold on each manifold segment to introduce feed fluid on a feed side of a filter layer in said filtration module, and to introduce filtrate on a filtrate side of said filtration module.

40. Apparatus for filtering a feed fluid to produce a filtrate and a retentate which comprises the apparatus of claim 31 wherein said plurality of manifold segments have a first end and a second end, a first fluid inlet positioned on said first end and being in fluid communication with fluid feed inlet conduits positioned within said manifold segments and filtration module in fluid communication with each of said manifold segments and an adaptor manifold on each manifold segment to introduce feed fluid on a feed side of a filter layer in said filtration module, and to introduce filtrate on a filtrate side of said filtration module and means for removing filtrate and retentate from said manifold segments.

41. Apparatus for filtering a feed fluid to produce a filtrate and a retentate which comprises the apparatus of claim 31 wherein said plurality of manifold segments have a first end and a second end, a first fluid inlet positioned on said first end and being in fluid communication with fluid feed inlet conduits positioned within said manifold segments and a first retentate outlet positioned on said second end and being in fluid communication with retentate outlet conduits within said manifold segments, means for removing filtrate and retentate from said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer.

42. The apparatus of claim 29 wherein a plurality of said manifold segments are connected together to effect fluid communication between at least one of (a) said filtrate inlet conduits and (b) said filtrate outlet conduits in adjacent manifold segments and at least one of (a) said fluid feed inlet conduits and (b) said retentate outlet conduits in adjacent manifold segments.

43. The apparatus of claim 42 wherein said plurality of manifold segments have a first end and a second end and a first fluid feed inlet positioned between said first end and said second end and being in fluid communication with fluid feed inlet conduits positioned within said manifold segments, means for introducing filtrate into said manifold segments and means for removing filtrate and retentate from said manifold segments.

44. The apparatus of claim 42 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, means for introducing filtrate into said manifold segments and means for removing filtrate from said manifold segments.

45. The apparatus of claim 42 wherein said plurality of manifold segments have a first end and a second end, a first fluid feed inlet positioned between said first end and said second end and being in fluid communication with fluid feed inlet conduits positioned within said manifold segments and a first retentate outlet positioned between said first end and said second end and being in fluid communication with retentate outlet conduits within said manifold segments, and a first filtrate outlet positioned between said first end and said second end and being in fluid communication with filtrate outlet conduits positioned within said manifold segments and means for introducing filtrate into said manifold segments.

46. The apparatus of claim 42 wherein said plurality of manifold segments have a first end and a second end and a first fluid feed inlet positioned on said first end and being in fluid communication with fluid feed inlet conduits positioned within said manifold segments and means for removing filtrate, means for introducing filtrate into said manifold segments and means for removing filtrate and retentate from said manifold segments.

47. The apparatus of claim 42 wherein said plurality of manifold segments have a first end and a second end, a first fluid feed inlet positioned on first end and being in fluid communication with fluid feed inlet conduits positioned within said manifold segments and a first retentate outlet positioned on said second end and being in fluid communication with retentate outlet conduits within said manifold segments, means for introducing filtrate into said manifold segments and means for removing filtrate from said of manifold segments.

48. The apparatus of claim 42 wherein said plurality of manifold segments have a first end and a second end, a first fluid feed inlet positioned on said first end and being in fluid communication with fluid feed inlet conduits positioned within said manifold segments, a first retentate outlet positioned on said second end and being in fluid communication with retentate outlet conduits within said manifold segments, a first filtrate outlet positioned on said first end a second filtrate outlet positioned on said second end, said first filtrate outlet and said second filtrate outlet being in fluid communication with filtrate outlet conduits positioned within said manifold segments and, means for introducing filtrate into said manifold segments.

49. Apparatus for filtering a feed fluid to produce a filtrate and a retentate which comprises the apparatus of claim 31 wherein said plurality of manifold segments have a first end and a second end and a first fluid feed inlet positioned between said first end and said second end and being in fluid communication with fluid feed inlet conduits positioned within said manifold segments, means for removing filtrate and retentate from said plurality of manifold segments and a filtration module in fluid communication with each of said manifold segments and an adaptor manifold on each manifold segment to introduce feed fluid on a feed side of a filter layer in said filtration module and to introduce filtrate on a filtrate side of said filter layer.

50. Apparatus for filtering a feed fluid to produce a filtrate and a retentate which comprises the apparatus of claim 42 wherein said plurality of manifold segments have a first end and a second end, a first fluid feed inlet positioned between said first end and said second end and being in fluid communication with fluid feed inlet conduits positioned within said manifold segments and a first retentate outlet positioned between said first end and said second end and being in fluid communication with retentate outlet conduits within said manifold segments, means for removing filtrate and retentate from said manifold segments, and filtration module in fluid communication with each of said manifold segments and an adaptor manifold on each manifold segment to introduce feed fluid on a feed side of a filter layer in said filtration module, and to introduce filtrate on a filtrate side of said filtration module.

51. Apparatus for filtering a feed fluid to produce a filtrate and a retentate which comprises the apparatus of claim 42 wherein said plurality of manifold segments have a first end and a second end, a first fluid feed inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, a first filtrate outlet positioned between said first end and said second end and being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filtration module and means for removing filtrate and retentate from said manifold segments.

52. Apparatus for filtering a feed fluid to produce a filtrate and a retentate which comprises the apparatus of claim 42 wherein said plurality of manifold segments have a first end and a second end, a first fluid inlet positioned on said first end and being in fluid communication with fluid feed inlet conduits positioned within said manifold segments and filtration module in fluid communication with each of said manifold segments and an adaptor manifold on each manifold segment to introduce feed fluid on a feed side of a filter layer in said filtration module, and to introduce filtrate on a filtrate side of said filtration module and means for removing filtrate and retentate from said manifold segments.

53. Apparatus for filtering a feed fluid to produce a filtrate and a retentate which comprises the apparatus of claim 42 wherein said plurality of manifold segments have a first end and a second end, a first fluid inlet positioned on said first end and being in fluid communication with fluid feed inlet conduits positioned within said manifold segments and a first retentate outlet positioned on said second end and being in fluid communication with retentate outlet conduits within said manifold segments, means for removing filtrate and retentate from said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter in said filtration module.

54. Apparatus for filtering a feed fluid to produce a filtrate and a retentate which comprises the apparatus of claim 42 wherein said plurality of manifold segments have a first end and a second end, a first fluid inlet positioned on said first end and being in fluid communication with fluid feed inlet conduits positioned within said manifold segments, a first retentate outlet positioned on said second end and being in fluid communication with retentate outlet conduits within said manifold segments, a first filtrate outlet positioned on said first end, a second filtrate outlet positioned on said second end, said first filtrate outlet and said second filtrate outlet being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

55. Apparatus for filtering a feed fluid to produce a filtrate and a retentate which comprises the apparatus of claim 30 wherein said plurality of manifold segments have a first end and a second end, a first fluid inlet positioned between said first end and said second end and being in fluid communication with fluid feed inlet conduits positioned within said manifold segments, a first retentate outlet positioned between said first end and said second end and being in fluid communication with retentate outlet conduits within said manifold segments, a first filtrate outlet positioned between said first end and said second end and being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filtration module and means for removing filtrate and retentate from said manifold segments.

56. Apparatus for filtering a feed fluid to produce a filtrate and a retentate which comprises the apparatus of claim 31 wherein said plurality of manifold segments have a first end and a second end, a first fluid inlet positioned on said first end and being in fluid communication with fluid feed inlet conduits positioned within said manifold segments, a first retentate outlet positioned on said second end and being in fluid communication with retentate outlet conduits within said manifold segments, a first filtrate outlet positioned on said first end, a second filtrate outlet positioned on said second end, said first filtrate outlet and said second filtrate outlet being in fluid communication with filtrate outlet conduits positioned within said manifold segments and a filtration module in fluid communication with each of said manifold segments and an adaptor manifold on each manifold segment to introduce feed fluid on a feed side of a filter layer in said filtration module, and to introduce filtrate on a filtrate side of said filter layer and means for removing filtrate and retentate from said manifold segments.

\* \* \* \* \*